United States Patent
Huang

[11] Patent Number: 5,980,003
[45] Date of Patent: Nov. 9, 1999

[54] DETACHABLE CASE ASSEMBLY FOR COMPUTER

[75] Inventor: Meng-Chou Huang, Taipei, Taiwan

[73] Assignee: First International Computer, Inc., Taipei, Taiwan

[21] Appl. No.: 09/017,120

[22] Filed: Jan. 31, 1998

[51] Int. Cl.[6] .............................. A47B 81/00; G06F 1/16
[52] U.S. Cl. .................................. 312/223.2; 312/265.5; 361/725
[58] Field of Search ............................ 312/223.2, 223.1, 312/257.1, 263, 265.5; 361/685, 724, 725, 726, 727

[56] References Cited

U.S. PATENT DOCUMENTS

| | | | |
|---|---|---|---|
| 4,939,622 | 7/1990 | Weiss et al. | 361/727 |
| 5,136,466 | 8/1992 | Remise et al. | 361/685 |
| 5,157,590 | 10/1992 | Barthel et al. | 361/725 X |
| 5,491,611 | 2/1996 | Stewart et al. | 312/223.2 X |
| 5,566,049 | 10/1996 | Nguyen | 361/685 |
| 5,600,538 | 2/1997 | Xanthopoulos | 361/685 X |
| 5,680,293 | 10/1997 | McAnnlly et al. | 361/685 |
| 5,754,396 | 5/1998 | Felcman et al. | 361/725 X |
| 5,768,099 | 6/1998 | Radloff et al. | 361/685 |
| 5,774,330 | 6/1998 | Melton et al. | 312/223.2 X |
| 5,790,372 | 8/1998 | Dewey et al. | 312/223.2 X |
| 5,790,375 | 8/1998 | Lee | 361/726 X |

Primary Examiner—Peter M. Cuomo
Assistant Examiner—Hanh V. Tran
Attorney, Agent, or Firm—W. Wayne Liauh

[57] ABSTRACT

A detachable housing structure of a computer, including a main base board and a detachable base board. The main base board includes a front section and a rear section. The rear section serves to bear a computer main circuit board, a power supply and other components. The detachable base board is detachably assembled with the front section. The detachable base board has an L-shaped structure, having a front vertical panel serving as the face panel of the computer and a horizontal panel on which the hard disc drive, floppy disc drive and CD ROM device are mounted. When assembling the detachable base board with the main base board, the detachable base board is locked and located by engaging structure and locking mechanism. The detachable base board can be easily drawn out of the main base board for maintenance, replacement and expansion.

7 Claims, 5 Drawing Sheets

DETACHABLE CASE ASSEMBLY FOR COMPUTER

1. Field of the Invention

The present invention relates to a detachable housing structure of a computer, on which a hard disc drive, a floppy disc drive and CD ROM device are mounted. The detachable base board can be easily drawn out of the main base board of the computer for maintenance, replacement or expansion.

2. Background of the Invention

In the design of the housing structure of a computer, generally it is considered whether the interior space of the housing can receive the respective computer components such as the power supply, main circuit board, disc drive, CD ROM device, etc. For example, in the housing structure of an on-desk computer, because such computer is rested on a desk or a working table, it is unnecessary to consider the dimension of the housing. However, with respect to a portable computer or a small dimension on-desk computer, such computer is required to be light, thin, short and small. Therefore, it is important how to arrange the interior space of the housing for reducing the volume and weight of the computer.

Moreover, after purchasing a computer, it is often necessary to expand the function thereof. With respect to the housing of the on-desk computer with larger interior space, it is relatively easy to make later replacement, expansion and maintenance. However, with respect to the housing of the small type computer, it is important to such arrange the components in the compact interior space as to facilitate later replacement, expansion and maintenance.

SUMMARY OF THE INVENTION

It is therefore a primary object of the present invention to provide a computer housing structure which is light, thin, short and small, while permitting easy replacement, expansion and maintenance of the components. Such housing structure is especially applicable to a portable computer or other small dimension or general dimension computer.

It is a further object of the present invention to provide a detachable housing structure of a computer, including a main base board and a detachable base board. The main base board includes a front section and a rear section. The rear section serves to bear a computer main circuit board, a power supply and other components. The detachable base board is detachably assembled with the front section. The detachable base board has an L-shaped structure, having a front vertical panel serving as the face panel of the computer and a horizontal panel on which the hard disc drive, floppy disc drive and CD ROM device are mounted. When assembling the detachable base board with the main base board, the detachable base board is locked and located by engaging structure and locking mechanism. The detachable base board can be easily drawn out of the main base board for maintenance, replacement and expansion.

It is still a further object of the present invention to provide the above detachable housing structure of a computer, which can be separately manufactured and then assembled with the main base board. Therefore, the working time is shortened and the production efficiency can be increased.

The present invention can be best understood through the following description and accompanying drawings, wherein:

DETAILED DESCRIPTION OF THE PREFERRED EMBODIMENT

Figure 1:
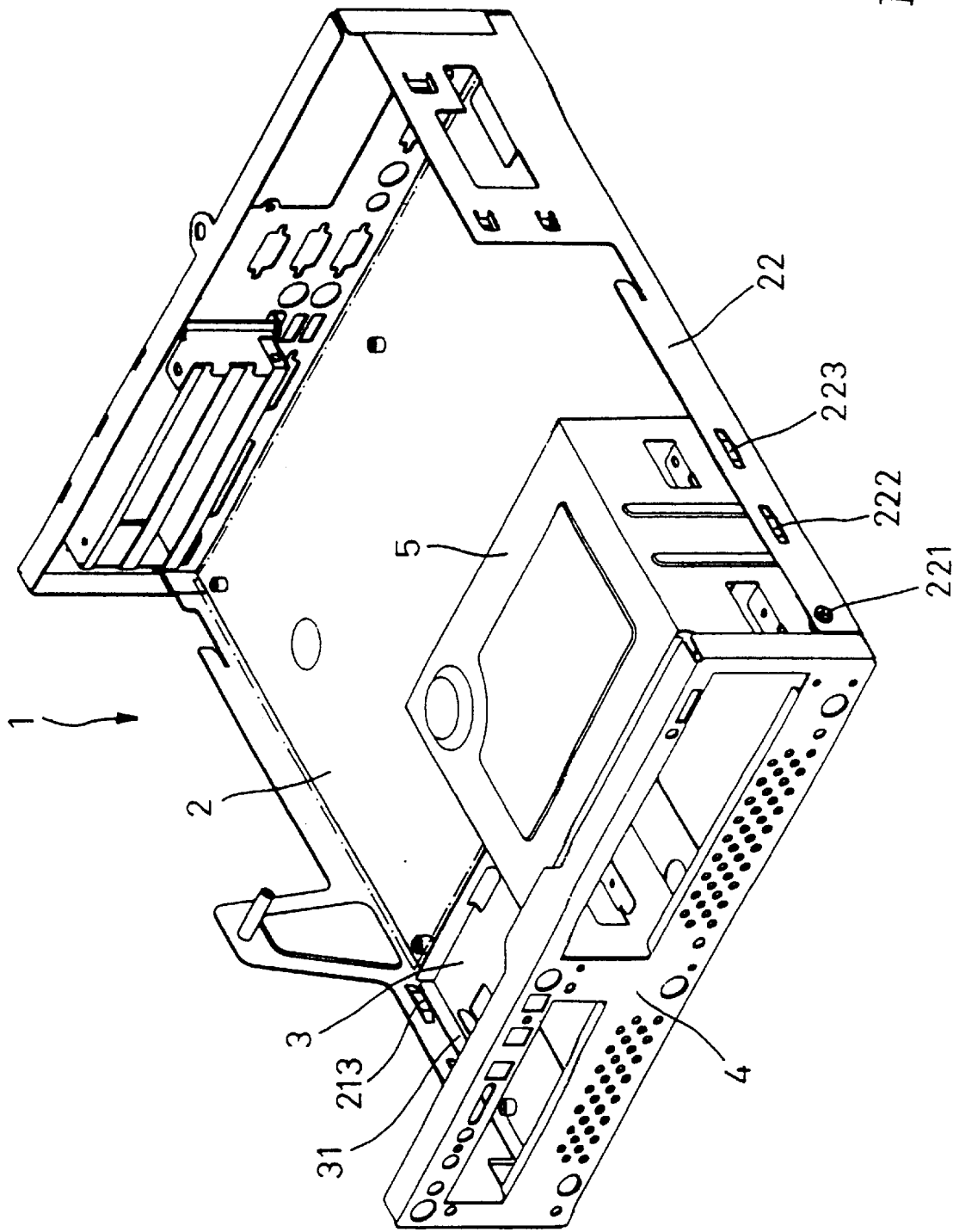
FIG. 1 is a perspective assembled view of the main base board and detachable base board of the present invention.
Figure 2:
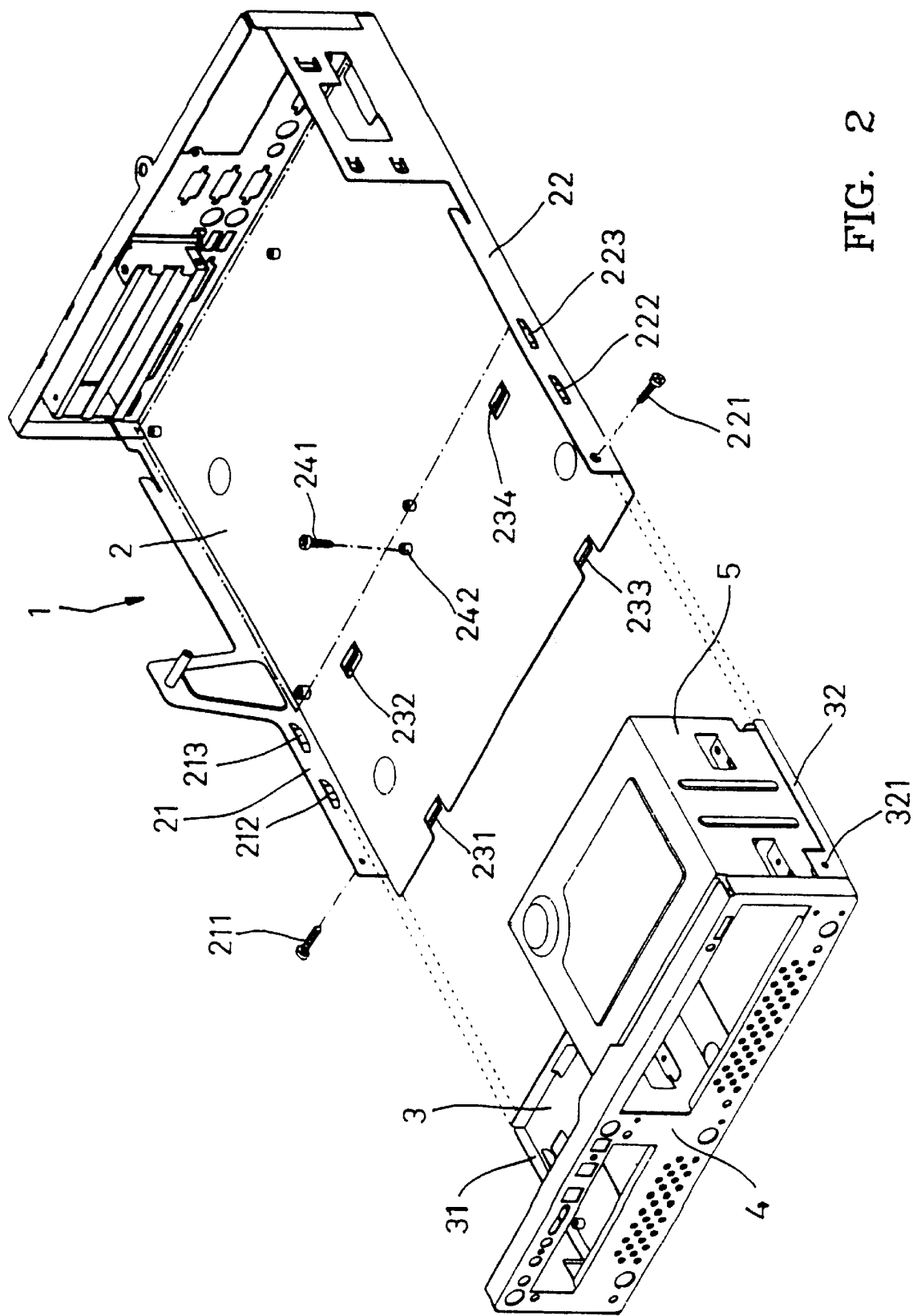
FIG. 2 is a perspective view according to FIG. 1, in which the detachable base board is drawn out of the main base board.

Please refer to FIGS. 1 and 2. The present invention includes a main base board 1 and a detachable base board 3. The main base board 1 has a horizontal panel 2 divided into a front section and a rear section.

The rear section serves to bear a computer main circuit board (as shown by the phantom line) and other necessary components of the computer, such as a power supply, an interface card, etc. The computer main circuit board generally is locked by screws. The front section of the main base board 1 is punched with several L-shaped stopper plates 231, 232, 233, 234.

In addition, the inner sides of the left and right walls 21, 22 of the main base board 1 at a certain height are punched with several pairs of oppositely inward projecting plates 212, 213, 222, 223. The inward projecting plates together with the horizontal panel 2 define parallel guide channels as drawing rails for the detachable base board 3.

When assembling the detachable base board 3 with the main base board 1, the left and right side edges 31, 32 of the detachable base board 3 are guided by and slided along the guide channels of the main base board 1 to upper side of the front section of the main base board 1.

Figure 4:
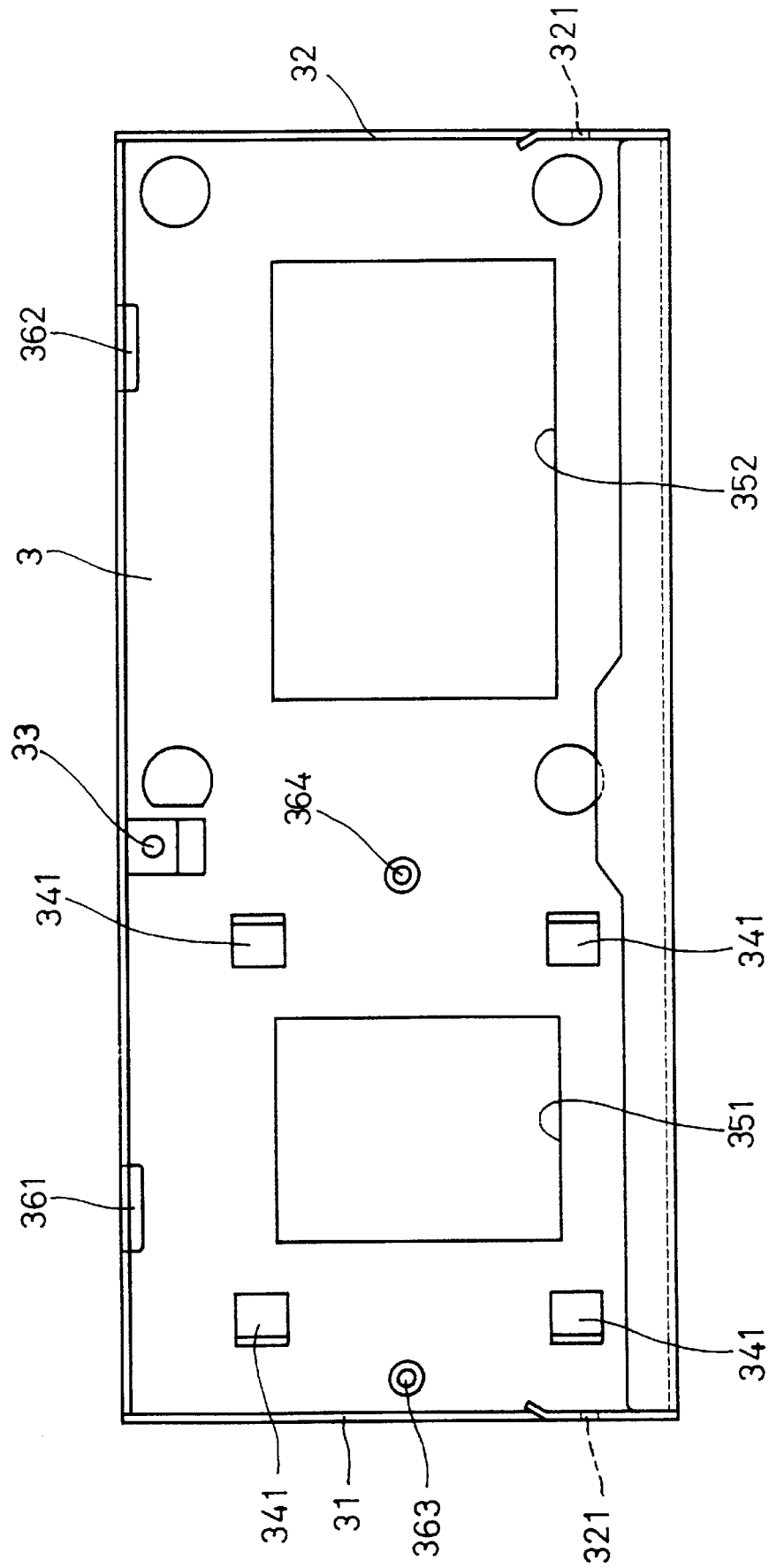
FIG. 4 is a top view of the detachable base board of the present invention.

The detachable base board 3 has an L-shaped structure, having a front vertical panel 4 serving as the face panel of the computer and a horizontal panel on which the hard disc drive, floppy disc drive and CD ROM device are mounted. The detachable base board 3 is formed with several openings 361, 362, 351, 352 corresponding to the L-shaped stopper plates of the front section of the main base board 1 (as shown in FIG. 4). Therefore, when the detachable base board 3 is assembled with the main base board 1, the rear edges of the openings snugly abut against and locate the stopper plates 231, 232, 233, 234.

In a preferred embodiment of the present invention, the openings 351, 352 formed substantially at the central portion of the detachable base board 3 are directly punched on the horizontal panel with a rectangular profile (as shown in FIG. 4). This can reduce the weight of the detachable base board.

After the main base board 1 is engaged with the detachable base board 3, they are further connected with each other by general bus lines and connectors (not shown). In order to lock the main base board 1 with the detachable base board 3, the present invention is also provided with locking mechanism for locking and locating the detachable base board with the main base board.

Figure 3:
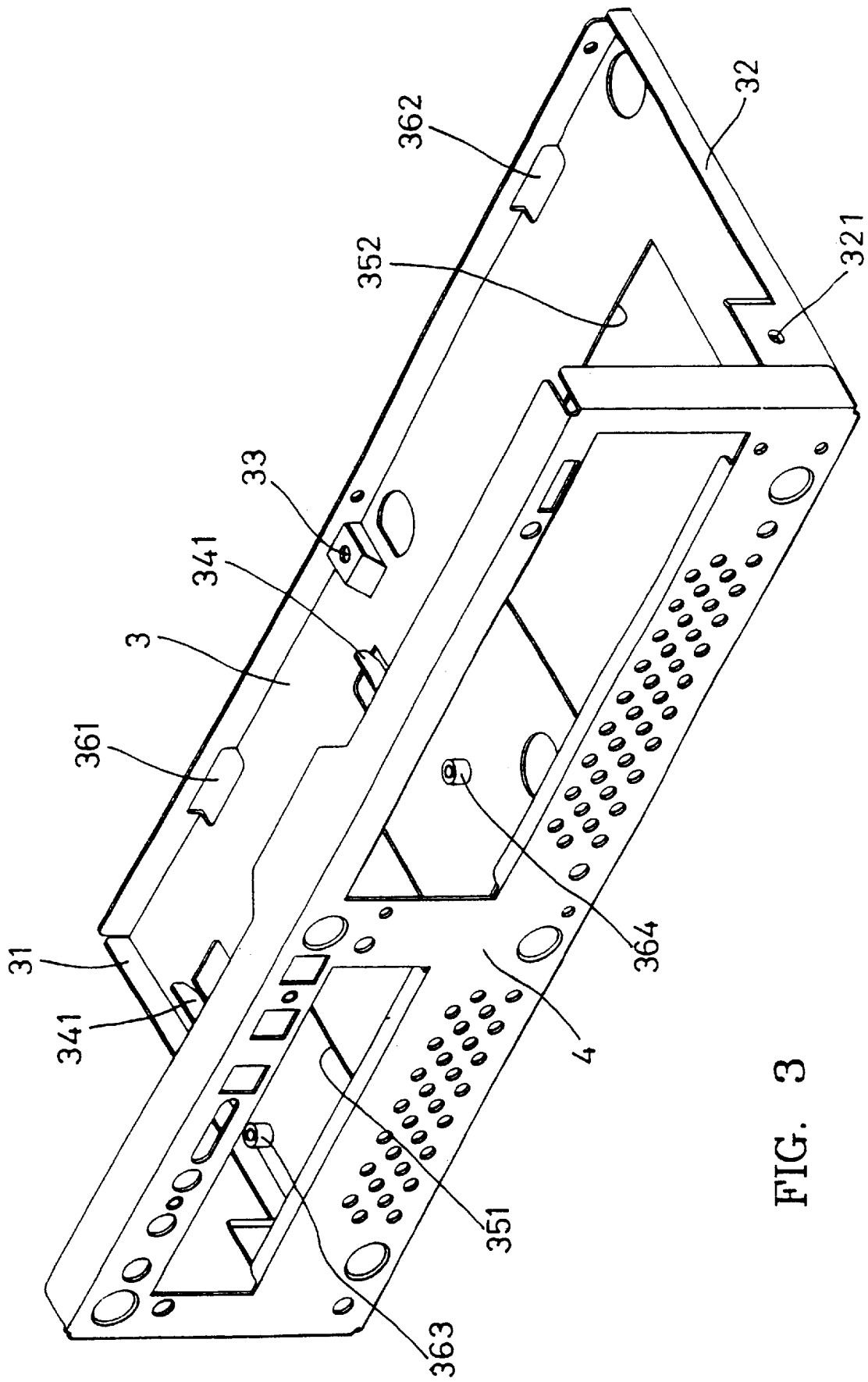
FIG. 3 is a perspective view of the detachable base board of the present invention.

The locking mechanism includes at least one locking thread hole 242 formed on the main base board 1 and a through hole 33 formed on the detachable base board 3 corresponding to the locking thread hole 242 (as shown in FIG. 3). A screw 241 can be screwed through the through hole 33 into the thread hole 242 to lock the detachable base board 3 with the main base board 1.

The locking mechanism further includes through holes formed on left and right walls 21, 22 of the main base board 1 and thread holes 321 formed on side edges of the detachable base board 3 corresponding to the through holes. Locking screws 211, 221 can be passed through the through holes into the thread holes to further lock the main base board and the detachable base board.

A CD ROM device rack 5 can be mounted on one side of the horizontal panel of the detachable base board 3, while a disc drive rack can be mounted on the other side thereof for bearing and fixing a floppy disc drive and a hard disc drive.

Figure 5:
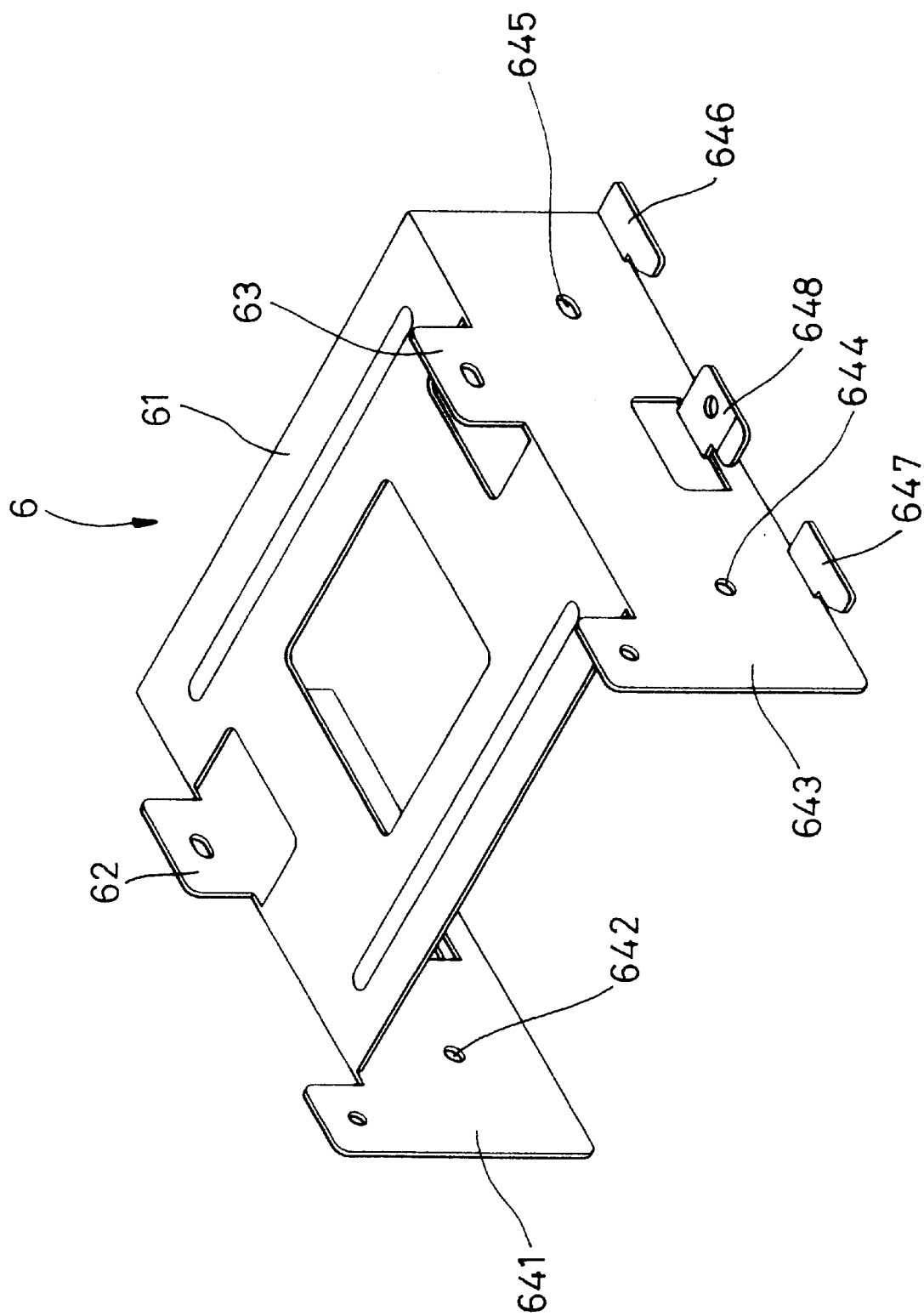
FIG. 5 is a perspective view of the disc drive rack of the present invention.

FIG. 5 shows the disc drive rack 6 which includes a U-shaped support having two lateral vertical walls 641, 643. Several engaging plates 646, 647 are disposed at bottom ends of outer sides of the vertical walls. When assembled with the detachable base board 3, the engaging plates are engaged with the punched plates 341 of the horizontal panel of the detachable base board 3 to locate the U-shaped support thereon. The bottom space of the U-shaped support serves to receive the hard disc which is locked by screws screwed in the thread holes 642, 644, 645.

The vertical walls 641, 643 are further punched with through holes and outward extending locking plates 648, whereby screws can be screwed into the thread holes 363, 364 of the detachable base board 3 to lock the U-shaped support thereon.

The floppy disc drive can be mounted on the top panel 61 of the disc drive rack. The top end of the vertical walls 641, 643 are formed with through holes and upright projecting plates 62, 63 for locking the floppy disc drive by screws.

According to the above arrangement, the detachable base board is detachably assembled with the main base board and the disc drive rack can be easily separably mounted on the detachable base board for maintenance, replacement, expansion, etc.

It is to be understood that the above description and drawings are only used for illustrating one embodiment of the present invention, not intended to limit the scope thereof. Any variation and derivation from the above description should be included in the scope of the present invention.

What is claimed is:

1. A detachable housing structure of a computer, comprising:

a main base board including a first horizontal panel which is divided into a front section and a rear section;

a plurality of L-shaped stopper plates formed on the front section of the first horizontal panel of the main base board;

a plurality of spaced apart guide channel structures formed on the inner sides of a left wall and a right wall of the main base board, to form a pair of guide channels therebelow;

a detachable base board having a front vertical panel serving as a face panel of the computer and a second horizontal panel, said second horizontal panel being co-planar with the first horizontal panel of the main base board so as to cooperatively and complementarily form a computer housing structure;

a left and a right side edges formed on the detachable base board being slidable along the guide channels of the main base board when assembling the detachable base board with the main base board;

the detachable base board being formed with a plurality of openings corresponding to the L-shaped stopper plates of the front section of the main base board, the openings are formed such that, when the detachable base board is assembled with the main baseboard, rear edges of the openings snugly abut against the L-shaped stopper plates; and a locking mechanism for locking the detachable base board with the main base board.

2. The detachable housing structure as claimed in claim 1, wherein the openings are formed substantially at a central portion of the detachable base board and are directly punched on the second horizontal panel with a rectangular profile.

3. The detachable housing structure as claimed in claim 1, wherein inner sides of the left and right walls of the main base board at a certain height are punched with at least one pair of oppositely inward projecting plates, and the inward projecting plates together with the front section of the first horizontal panel defining parallel guide channels for the detachable base board.

4. The detachable housing structure as claimed in claim 1, wherein the locking mechanism includes at least one locking thread hole formed on the main base board and a through hole formed on the detachable base board corresponding to the locking thread hole, whereby a screw is screwed through the through hole into the thread hole to lock the detachable base board with the main base board.

5. The detachable housing structure as claimed in claim 4, wherein the locking mechanism further includes through holes formed on left and right walls of the main base board and thread holes formed on edges of the detachable base board corresponding to the through holes, whereby locking screws are passed through the through holes into the thread holes to lock the main base board and detachable base board.

6. The detachable housing structure as claimed in claim 1, further comprising a disc drive rack mounted on the detachable base board, the disc drive rack including a U-shaped support having two lateral vertical walls, several engaging plates being disposed at bottom ends of outer sides of the vertical walls, whereby when assembled with the detachable base board, the engaging plates are engaged with the punched plates of the second horizontal panel of the detachable base board to locate the U-shaped support thereon, a bottom space of the U-shaped support serving to receive the hard disc which is locked by screws, the vertical walls being further punched with through holes and outward extending locking plates for locking the U-shaped support on the detachable base board.

7. The detachable housing structure as claimed in claim 6, wherein a floppy disc drive can be mounted on a top panel of the disc drive rack, top ends of the vertical walls of the U-shaped support being formed with through holes and upright projecting plates for locking the floppy disc drive by screws.

* * * * *